United States Patent [19]

Feldbrugge et al.

[11] B 3,919,435

[45] Nov. 11, 1975

[54] MEAT ANALOG SYSTEM

[75] Inventors: Alonzo H. R. Feldbrugge, New York, N.Y.; Marshall M. Rankowitz, Bronx, N.Y.; Arno Huste, Rego Park, N.Y.

[73] Assignee: General Foods Corporation, White Plains, N.Y.

[22] Filed: Sept. 10, 1973

[21] Appl. No.: 395,496

[44] Published under the Trial Voluntary Protest Program on January 28, 1975 as document no. B 395,496.

Related U.S. Application Data

[63] Continuation of Ser. No. 114,720, Feb. 11, 1971, abandoned.

[52] U.S. Cl. ................................. 426/574; 426/802
[51] Int. Cl.² ..................... A23J 3/00; A23L 1/04
[58] Field of Search ................... 426/350, 574, 802

[56] References Cited

UNITED STATES PATENTS

| | | | |
|---|---|---|---|
| 3,093,483 | 6/1963 | Ishler et al. | 426/137 |
| 3,658,550 | 4/1972 | Hawley | 426/350 |
| 3,719,498 | 3/1973 | Leidy et al. | 426/350 |
| 3,719,499 | 3/1973 | Hai et al. | 426/350 |

*Primary Examiner* — James R. Hoffman
*Attorney, Agent, or Firm* — Bruno P. Struzz; Thomas V. Sullivan; Daniel J. Donovan

[57] ABSTRACT

A meat analog is formed from a vegetable protein gel precursor that has incorporated animal fatty tissue and/or vegetable oil with a thermostable, polymeric, carbohydrate gel. The carbohydrate gel at least partially prevents or minimizes apparent emulsification of the fatty tissue and/or vegetable oil. The vegetable protein gel precursor is heated which causes gelation and formulation of a food which serves as a meat substitute.

8 Claims, No Drawings

MEAT ANALOG SYSTEM

This is a continuation of application Ser. No. 114,720, filed Feb. 11, 1971, and now abandoned.

BACKGROUND OF THE INVENTION

This invention is directed to the formation of meat analog systems that employ a heat set vegetable protein which is formulated to substitute for proteinaceous meaty material.

In recent years, extensive development has been undertaken in providing substitutes for meat protein. Through appropriate processing steps and with different formulations, a source of vegetable protein may be formulated into a system to substitute for the proteinaceous meaty material.

Boyer, U.S. Pat. No. 2,682,466, patented June 29, 1954, discloses synthetic meat products which use quantities of vegetable protein filaments. These filaments are made by forcing colloidal protein dispersion through spinnerets into a coagulating bath causing precipitation of the protein through the filaments. Binder systems of various materials such as starches, cereals, gums and alginates may be employed to form the vegetable filaments into a cohesive mass.

Anson and Pader, holders of numerous U.S. patents, including U.S. Pat. Nos. 2,802,737, 2,813,024, 2,813,025, 2,830,902 and 2,833,651, patented in either 1957 or 1958, disclose protein-containing products resembling meat. These patentees teach the formation of a "chewy protein gel" wherein various techniques to form meat-like products are taught. The chewy protein gel is made by adjusting a gel precursor such as soy or peanut concentrates to a pH of above 6.0 followed by heating to convert to the chewy protein gel. Various additives including protein filaments, doughs, flavoring ingredients, etc., may be incorporated in the synthetic meat products.

Kjelson, U.S. Pat. No. 3,343,963 patented Sept. 26, 1967, teaches the formation of high protein food products resembling chopped ground meats. A source of spun edible protein fibers is bound together with a binder consisting of albumen, gluten and particulate oilseed material. The composition is heat set to form the simulated meat product.

More recently, Hartman, U.S. Pat. No. 3,320,070 patented May 16, 1967, has taught the manufacture of bacon-like products from man-made fibers of natural vegetable protein with a binder including albumen and an edible proteinate. The bacon-like product is formulated with lean and nonlean portions so that the real meat product is resembled.

SUMMARY OF THE INVENTION

The technique of the present invention is directed to the formation of meat substitute products by use of a vegetable material concentrated in a source of protein. A vegetable gel derived from the protein concentrate is an essential ingredient serving as a critical constituent in a wide variety of meat analog systems. Meat products in general, such as those derived directly without reprocessing, may be duplicated in essential respects utilizing the present technique. Additionally, reprocessed meat systems such as those contained in an emulsion, as in a sausage, may be resembled in essential respects by rebalancing the formulation and changing the processing techniques.

A required constituent in the formation of the meat substitute is a concentrated source of vegetable protein such as that derived from defatted oilseeds, and this protein source possesses the quality that it may be heat set into a gel system in the presence of water. This gel is formed merely by the application of heat which causes the desired gelation. However, in order to form a complete analog system, it is desirable that various ingredients, as for example, fats, flavors, starches, emulsifiers, coloring materials, etc., to form a completely balanced, high quality meat substitute be employed.

Meat products contain inclusions of fat, and it is essential that the meat analog contains either animal fat or vegetable oil. The protein vegetable gel serves only as a direct substitute for the proteinaceous meaty material exclusive of fat incorporation. Therefore, it is essential that the meat analog contain inclusions of fat and/or vegetable oil in the final product.

It has been discovered that mere addition of a rendered animal fat and/or vegetable oil to the protein gel precursor results in a lower quality product from organoleptic evaluation, since the juiciness qualities of the final product are minimal. This lack of juiciness is significantly reduced by using non-rendered animal fat, but even in this case it is possible to obtain some increase in juiciness employing the technique of the present invention. If the fat and/or oil is merely added to the gel precursor, the total matrix upon gelation appears to tie the fat as well as water tightly into the total system. Apparently, the fat is emulsified by the gel precursor which binds the fat as well as water into the matrix. Upon consumption of the final meat analog, the apparent emulsification of the fat and/or oil results in a dry, lower quality product.

The technique of the present invention employs at least a partial barrier between the fat or oil and the protein gel precursor to at least minimize contact of these essential ingredients. With this barrier, which is thermostable, the apparent emulsification of the fat or oil may be minimized and an increase in juiciness is realized.

The barrier between the vegetable protein material and the fat or oil is formed from a polymeric carbohydrate gel such as that derived from algin or pectin. This barrier has the characteristic in that it does not diminish the overall quality of the final food. Since the barrier is a gel that is thermostable, it does not deteriorate when the protein gel precursor is set by the application of heat. Additionally, the polymeric carbohydrate gel is applied to and/or mixed with the fat or oil prior to formation of a gel and thus the exact concentration and distribution in the gel may be controlled.

It is an object of the present invention to produce a meat analog containing a vegetable protein gel with inclusions of an animal fat and/or vegetable oil.

It is a further object of the invention to provide a barrier layer in the meat analog by coating or mixing a polymeric carbohydrate gel with animal fat and/or vegetable oil to prevent apparent emulsification by the vegetable protein.

DETAILED DESCRIPTION OF THE INVENTION

The meat analogs made by the present invention resemble and duplicate in essential physical and taste characteristics a wide variety of meat products. The present meat analogs may resemble specific meat cuts from an animal such as bacon, steak, pork chops, etc., as well as meat systems that have been reprocessed and reformulated with other components as in a sausage product.

As employed herein, a meat analog is used as in its normal definition in that the formed product resembles a meat product, yet is entirely distinct therefrom in its source materials. Meat products with filler components lie outside the scope of an analog since the filler is employed as an extender without forming a new product. In contrast, the vegetable proteinaceous material is formulated to resemble the meat source in essential characteristics.

An analog resembling natural meat cuts may be a system with a substantial amount of fibers bound together in a matrix. The fibers may be derived from vegetable proteinaceous material and aid in adding highly chewy qualities to the final product.

In contrast, a sausage or sausage analog is not considered to resemble natural meat cuts. A sausage analog is formulated and processed so as to duplicate as closely as possible meat products that are initially formed into an emulsion system. The meat emulsion is heated which results in gelation introducing a degree of rigidity. The initial meat emulsion with the water component has flow characteristics so that it may be readily shaped, as in a casing, prior to the gelation to a stable physical form. Examples of such sausages are bologna, olive loaf, frankfurters, etc.

A vegetable proteinaceous gel material of the analog may serve as a binding system in natural meat cut analogs and be dispersed in non-uniform qualities throughout employed fibers. The vegetable gel may be present with a degree of uniformity throughout the food as in a sausage analog, and the vegetable gel precursor may be considered to be the analog counterpart of the meat emulsion.

In order to produce a high quality meat product, a level of fat and/or vegetable oil must be present in the system. For example, in a natural meat cut such as a steak, fat is present. Thus, in duplication of the meat analog this ingredient or a vegetable oil must be present. Additionally, in the production of a sausage type product, the analog also must have fat and/or vegetable oil present in discrete particles or pockets. Thus, it is essential in the production of the analog system that fat and/or vegetable oil be present as a distinct entity in a readily identifiable form and not completely bound into the matrix. The vegetable protein gel precursor apparently emulsifies the fat or oil which results in a lack of juiciness in the final product when it is consumed. This lack of juiciness is physically evidenced by a lack of fat, oil and water release in the final product. Addition of increased quantities of fat, oil and water do not directly solve this lack of juiciness. Therefore, it is essential that the apparent emulsification of the fat or vegetable oil be at least reduced. While the protein gel precursor apparently emulsifies both animal fat and vegetable tissue, it has been found that there is a great deal of distinction between non-rendered animal fat and rendered animal fat. In the non-rendered animal fat, a cellular structure is present which inhibits this apparent emulsification to a significant degree. Therefore, a juicy quality is present when employing non-rendered animal fat in the vegetable gel. However, some increase in juiciness results when using the barrier composition of the present disclosure. With the use of rendered animal fat and vegetable oil, the added use of the polymeric, carbohydrate gel results in a pronounced increase in the water and fat-oil release in the final gelled meat analog.

The technique of the present disclosure employs a coating or mixture of a barrier component of a thermostable gel formed from a polymeric carbonated gel precursor with the fat or oil. The gel precursors, illustratively, are materials such as algins which may be naturally extracted, physically degraded algins, low methoxyl pectins or carragheens. These materials which are the gel precursor may be mixed or coated into the fat or oil. Thereafter, formation of the carbonated gel occurs. Illustratively, contact with alkaline earth metal ions such as calcium causes gelation. The use of these gel forming agents causes the precursor to form a thermostable gel which serves as an effective barrier to prevent and minimize the apparent emulsification and loss of juiciness in the product.

The technique of forming the polymeric, carbohydrate gel is well known in the art, and this technique alone is admittedly old. For example, Rivoche, U.S. Pat. Nos. 2,786,764 and 2,791,508; Green et al., U.S. Pat. No. 2,992,925 and Ishler, U.S. Pat. No. 3,093,483 teach techniques in formation of a thermostable gel. Therefore, the techniques of forming the polymeric carbohydrate gel is incorporated by reference herein.

The distribution of the fat or oil may be controlled insofar as the size of the fat layer or particle. The technique of gel formation on the fat or oil may be accomplished by a wide variety of techniques. For example, an emulsion of the fat or oil with a hydrophilic, colloidal, carbohydrate solution may be sprayed into a solution of the insolubilizing, alkaline earth ion such as calcium chloride and excess material may be separated from the desired composition. Alternatively, the fat or oil with the carbohydrate material may be frozen and insolubilized with the calcium salt. Another technique includes coating of the fat or oil in solid form by the gel precursor followed by dipping into the insolubilizing salt solution.

Thus, the important criteria that is essential in the present invention is the polymeric carbohydrate gel precursor is insolubilized in the presence of the fat or oil and provides a barrier mixture. Therefore, when the fat or oil is contacted with the vegetable protein gel precursor, the thermostable gel inhibits and limits apparent emulsification by the vegetable protein. It is not necessary that the carbohydrate gel completely coat the fat or oil and, as a practical matter, the gel will only partially protect the base fat or oil. Therefore, some apparent emulsification by the vegetable protein gel precursor of the fat or oil will take place. However, the result that is obtained is that significant, apparent emulsification may be minimized. Additionally, the degree of emulsification may be controlled as desired, as for example, controlling the surface area of the fat or oil that is coated with the carbohydrate gel.

The vegetable proteinaceous material employed in the present invention is defined to have the characteristic and quality that upon heating in a water carrier, gelation to a stable, physical form occurs. As in typical gel systems, a degree of rigidity is introduced which is coupled with elasticity and resilience. Ordinarily, the protein content based on the weight of the protein vegetable material will be above 30percent and more desirably above 60 percent, which is based on the solids content. No upper limit on the maximum protein content exists, and protein concentrations of about 95 percent are satisfactory and desirable.

A vegetable gel is employed herein in its normal definition, that is, solid or semi-solid vegetable system in colloidal dimensions in a water carrier liquid. The sources of vegetable material employed are varied, as for example, defatted oilseeds, and may include soy, peanuts, cottonseed, peas, etc. The vegetable protein is in concentrated form and is preferably bland and, in the case of soy, unwanted flavors are removed. Concentrated protein materials are readily available in commercial form such as isolates, concentrates and flour.

A necessary component is water, since in order for the gel to form this material must be present. The total water content in the product prior to gelation may vary since a large portion of the analog may comprise fibers or fillers. Additionally, the water content of the final product will be determined by the type of meat product that is to be duplicated by the analog system. For example, in the sausage analog, a dry, intermediate or wet sausage may be duplicated. In this latter class of products, water contents of 42 to 74 percent have been found acceptable with an optimum range of 52 to 65 percent by weight. However, these percentage figures are not considered to be limiting, since different types of sausage analogs may be produced. Total fat and/or vegetable oil content in a sausage analog system of from about 5 to 30 percent by weight are desirable and satisfactory.

In the formation of the gel constituent, satisfactory results occur when the primary gel component is derived from the vegetable protein material. However, with a sausage analog, superior results have been found to take place when at least an additional non-vegetable source of protein is employed which also gels upon heating. These sources of protein are albumen, casein and whey or combinations thereof, and yield a product that is considered to be a high quality gel system. In duplicating a sausage, the concentrations by weight of the gelable constituents; namely, the vegetable protein material in conjunction with the albumen, casein, whey and combinations are critical if the final product is to possess a superior gel system. Since the concentration of vegetable material may vary depending on the degree of refinement, the critical ratio of materials is given on the basis of the protein content of the vegetable material.

The minimum concentration of vegetable protein to albumen, casein and whey would be of the order of about 3.4:1, 5:3 and 1:1, respectively. With combinations of albumen, casein and whey, the minimum concentration of vegetable material is intended to encompass a weighted total of these added gel precursors. The maximum vegetable protein concentration to these added gel components will be of the order of about 40:1.

When using component combinations of vegetable proteinaceous material with the added albumen, casein and whey, it is desirable that uniformity of these components be obtained prior to the gelation conditions. Non-uniformity of gels may be obtained and an acceptable product can be realized, however, a superior gel system is considered to be obtained when uniformity in mixing is obtained.

The conditions of gelation are obtained merely by heating which brings about the desired result. Elevated temperatures preferably in the range of 150° to about 300°F will cause the gel to form. Minimum temperatures will cause gelation but will additionally result in some protein degradation. Optimum gelation temperatures are considered to lie above the boiling point of water in autoclaving techniques wherein elevated pressure is satisfactorily employed. To complete the desired flavor characteristics and appearance of the meat analog, flavored spices and coloring components are highly desirable. These constituents may be mixed in either the gel precursor or they may be separately added to the final gel as well as the combination of both of these techniques.

To further illustrate the innovative aspects of this invention, the following examples are provided:

EXAMPLE 1

To form a juicy, frankfurter-type analog, the following constituents were employed:

| | Weight % |
|---|---|
| Soy isolate (30% solids) | 41.6 |
| Wheat gluten/soy grits/flour mixture (Expanded filler with ammonium carbonate (30% solids) | 24.2 |
| Encapsulated vegetable oil composition (50% water) | 26.0 |
| Albumen | 1.0 |
| Seasoning/flavor/color | 5.1 |
| Soybean oil | 1.5 |

In producing a protected vegetable oil, the following emulsion was made in a Waring Blender:

| | Volume % |
|---|---|
| Liquid soybean oil | 22.2 |
| Liquid coconut oil | 44.5 |
| 3% sodium alginate solution | 33.3 |

This emulsion was sprayed at room temperature using a hand atomizer into a 10 percent calcium chloride solution held at a temperature of about 40°F. The product was allowed to insolubilize for 5 minutes and then washed with cold water. The water content of this product was 50 percent.

The expanded filler material is a high protein constituent containing wheat gluten/soy grits/flour. This expanded filler is made by mixing the source constituents with a water concentration of about 25 percent. Ammonium carbonate at a concentration of about 0.6 percent is employed since this material increases the expansion effect during the processing. The residual ammonium carbonate concentration will approach 0 percent. The constituents are fed into an inlet of a heated Model X-25 Wenger Extruder wherein the mix is subjected to elevated temperature and pressure by a revolving screw in the extruder barrel. The constituents are extruded through two ⅜ inch diameter dies with a recorded pressure of approximately 150 psig. and a temperature of approximately 300°F at the die face. The material is soaked in water and excess water is removed to give a final solids content of 30 percent. The material is comminuted prior to subsequent mixing with component.

The soy isolate which has a pH of 6.2, wheat gluten/soy grits/flour mixture, albumen, seasoning, flavoring, color and soybean oil was mixed in a Hobart Silent Cutter for a 10-minute interval. The protected vegetable oil was added to the Silent Cutter with mixing for a 5-minute time period.

The composition is stuffed in a casing employing conventional equipment and heat set in a pressure cooker at an elevated temperature at 10 psig. for 10 minutes.

EXAMPLE 2

The process of Example 1 was repeated in all respects except that the encapsulated vegetable oil was replaced by vegetable oil without the encapsulation process. Thus, an equal weight liquid soybean oil and liquid coconut oil replaced the original vegetable oil, with sodium alginate present in an ungelled condition since the step of insolubilizing was eliminated. Additionally, added water was employed equal in weight to the water in the protected vegetable oil of Example 1.

Organoleptic evaluations of Example 1 and 2 gave the result that the product of Example 1 gave significant juiciness qualities. Visual evidence of the presence of the vegetable oil as a distinct entity was apparent when the Example 1 analog was sliced. A visual examination of a sliced sample of Example 2 did not readily show the separate presence of the vegetable oil. Additionally, upon warming of the analogs, Example 1 produced a ready release of liquid from the matrix upon squeezing. In contrast, squeezing of a warmed Example 2 produced a negligible and insignificant release of liquid.

From the foregoing description of specific embodiments of the present invention, numerous modifications and alterations will become readily apparent to those skilled in the art, and it is intended that such be included within the scope of the present invention.

What is claimed is:

1. A process for producing a food product which resembles meat products made from meat emulsions comprising:
   a. contacting a polymeric carbohydrate gel precursor with a material selected from the group consisting of non-rendered animal fat, rendered animal fat, vegetable oil, and combinations thereof and gelling said gel precursor to substantially encapsulate said material;
   b. forming a uniform mixture of:
      1. a protein gel precursor consisting of a vegetable proteinaceous material and a material selected from the group consisting of albumen, casein, whey, and mixtures thereof, said vegetable proteinaceous material having a vegetable protein content of above about 30 percent by weight and wherein the minimum weight ratio of the vegetable protein to albumen, casein or whey is about 3.4:1, 5:3, and 1:1, respectively, or a weighted ratio for mixtures thereof and wherein the maximum weight ratio of vegetable protein to albumen, casein, whey or mixtures thereof is about 40:1.
      2. water in an amount in the range of from about 42 to about 74 percent by weight of the mixture, and
      3. the substantially encapsulated material of a) in an amount in the range of from about 5 to about 30 percent by weight of the mixture;
   c. shaping said uniform mixture to a desirable form; and
   d. heating the shaped mixture to set the protein gel precursor to a stable, physical form.

2. The process of claim 1 wherein the gelling of said polymeric carbohydrate gel precursor is by use of alkaline earth metal ions.

3. The process of claim 2 wherein said alkaline earth metal ions comprise calcium.

4. The process of claim 2 wherein said polymeric carbohydrate gel precursor comprises algin.

5. The process of claim 2 wherein said polymeric carbohydrate gel precursor comprises pectin.

6. The process of claim 2 wherein said material of step a) comprises rendered animal fat, vegetable oil or a mixture thereof.

7. The process of claim 6 wherein said vegetable proteinaceous material comprises a defatted oilseed.

8. The process of claim 1 wherein said material of step a) comprises rendered animal fat, vegetable oil or a mixture thereof.

* * * * *